United States Patent [19]
Ziegler et al.

[11] 3,903,017
[45] Sept. 2, 1975

[54] POLYMERIZATION CATALYSTS

[75] Inventors: Karl Ziegler; Heinz Breil; Erhard Holzkamp; Heinz Martin, all of Mulheim (Ruhr), Germany

[73] Assignee: Studiengesellschaft Kohle m.b.H., Max-Planck-Institut for Kohlenforschung, Mulheim (Ruhr), Germany

[22] Filed: Apr. 20, 1972

[21] Appl. No.: 246,029

Related U.S. Application Data

[63] Continuation of Ser. No. 716,230, March 26, 1968, abandoned, which is a continuation of Ser. No. 301,609, Aug. 12, 1963, abandoned, which is a continuation-in-part of Ser. Nos. 469,059, Nov. 15, 1954, Pat. No. 3,257,332, Ser. No. 692,020, Nov. 26, 1957, Pat. No. 3,574,138, Ser. No. 482,412, Jan. 17, 1955, abandoned, Ser. No. 770,413, Oct. 29, 1958, Pat. No. 3,113,115, Ser. No. 482,413, Jan. 17, 1955, abandoned, Ser. No. 746,000, July 1, 1958, Pat. No. 3,070,549, Ser. No. 554,631, Dec. 22, 1955, abandoned, Ser. No. 527,413, Aug. 9, 1955, abandoned, and Ser. No. 514,068, June 8, 1955.

[30] Foreign Application Priority Data

| Nov. 17, 1953 | Germany | 3799 |
| Dec. 15, 1953 | Germany | 3862 |
| Dec. 23, 1953 | Germany | 3882 |
| Aug. 3, 1954 | Germany | 4348 |
| Jan. 19, 1954 | Germany | 3941 |
| Jan. 19, 1954 | Germany | 3942 |
| Aug. 16, 1954 | Germany | 4375 |
| Dec. 11, 1954 | Germany | 4603 |
| Dec. 13, 1954 | Germany | 4604 |
| Dec. 17, 1954 | Germany | 4629 |

[52] U.S. Cl. ............ 252/429 A; 252/441; 260/93.7; 260/94.9 B
[51] Int. Cl.$^2$ ........................................ B01J 31/14
[58] Field of Search ............................... 252/429 A

[56] References Cited
UNITED STATES PATENTS

| 2,905,645 | 9/1959 | Anderson et al. | 252/429 A |
| 3,027,360 | 3/1962 | Raum | 252/429 A X |
| 3,041,325 | 6/1962 | Farnham | 252/429 A X |
| 3,050,471 | 8/1962 | Anderson et al. | 252/429 A |

FOREIGN PATENTS OR APPLICATIONS

| 526,101 | 5/1955 | Italy | 260/93.7 |

OTHER PUBLICATIONS

Gaylord et al., *Linear and Stereoregular Addition Polymers*, Mack Printing Co., Easton, Pa. (1959) pages 94 & 95.

Natta et al., The Mechanism and Kinetics of the Polymerization of α-Olefins, Collection Czechosl. Chem. Common. 22, 191 (1957).

Natta et al., Stereospecific Polymerization of α-Olefins, Note III, Gazz. Chim. It., 87, 570 (1957).

Natta et al., Stereospecific Polymerization of α-Olefins, Chimica e Industria 38, 124 (1956).

Natta et al., The Stereospecific Polymerization of α-Olefins Note IV., Chim. It., 88, 219 (1958).

Natta et al., *Stereoregular Polymers and Stereospecific Polymerization*, Vol. 1, Pergamon Press, N.Y., N.Y. (1967) pages 91–99, 239–240, 340–361, 363–364.

*Primary Examiner*—Patrick P. Garvin
*Attorney, Agent, or Firm*—Burgess, Dinklage & Sprung

[57] ABSTRACT

A polymerization catalyst for polymerizing olefins, such as ethylene and its homologs, in the form of the reaction product obtained by mixing a titanium trihalide such as titanium trichloride with an organometallic compound which has a reducing action on the valence of the titanium trihalide. Examples of organometallic compounds include organo-aluminum and -magnesium compounds such as the metal alkyls and metal alkyl halides.

10 Claims, No Drawings

POLYMERIZATION CATALYSTS

The catalyst composition in accordance with the invention essentially consists of a reaction product obtained on mixing a titanium halide with an organo-metallic compound containing at least one hydrocarbon radical bonded to metal.

The organo-metallic compound is preferably an organo-aluminum compound though organo-magnesium compounds and other organo-metallic compounds are also suitable. The organo-metallic compounds thus may be an alkyl metal halide such an alkyl aluminum halide or alkyl magnesium halide, an alkyl metal hydride, such as an alkyl aluminum hydride, an aryl metal halide. A preferable group of organo-metallic compounds are those having the general formula $MR_n$ where M is a metal, R is a hydrocarbon radical and $n$ is the valence state of the metal. Such organo-metallic compounds may, for example, be metal alkyls, such as aluminum trialkyls or magnesium dialkyls or metal aryls, such as aluminum triaryls, magnesium diaryls. Also suitable are metal hydrides, such as aluminum hydride or organo-aluminum hydrides.

Specific examples of the applicable organometallic compounds and hydrides include aluminum triaryl, aluminum tripropyl, aluminum tridodecyl, aluminum trioctyl, aluminum triisobutyl, aluminum triphenyl, diethylaluminum chloride, diethyl aluminum bromide, diisobutyl aluminum chloride, dibutyl aluminum fluoride, methoxydimethyl aluminum, diethyl aluminum hydride, diphenylaluminum monochloride, phenoxy aluminum diethyl, piperidyldiethyl aluminum, diphenyl aluminum monobromide $C_2H_5)_2—Al—Al(CH_3)_2$ $(C_2H_5)_2AlSC_2H_5$ magnesium dimethyl, butyl magnesium chloride phenyl magnesium bromide, propyl magnesium chloride, zinc dihexyl, and the like.

The titanium halide is preferably a titanium tetrahalide such as titanium tetrachloride, titanium tetrabromide, or the like.

Since the organo-metallic compound or hydride when admixed with the titanium halide exerts a reducing effect on the titanium halide, the titanium trihalide, such as the trichloride or bromide may be used in place of the tetrahalide. The tetrahalide is initially reduced to the trihalide so that the tetra-and-tri-halide may be considered complete equivalents and the use of the tetrahalide in fact involved the use of the trihalide as the same is converted to the trihalide or passes through the trivalent state.

The mol ratio of the organo-metallic compound to the titanium halide, as for example the titanium tetraor-tri-halide may vary within wide limits as, for example, between a few tenths of a mole to 12 or more mols of the organo-metallic compound per mol of the titanium halide. For certain purposes, it has been proven advantageous to use a ratio of 8 to 12 mols of the organo-metallic compounds, such as the organo-aluminum compound per mol of the titanium halide.

As mentioned, the organo-metallic compounds or the metal hydride will exert a reducing effect on the titanium halide and will reduce the halide in certain instances down to the monovalent form. The valent state of the titanium is in many cases lowered at least in part to below 3. Thus, for example, when using the aluminum trialkyls or corresponding magnesium compounds, the amount thereof indicated above is sufficient to lower the valent state of the titanium at least in part below 3.

The catalyst is formed by merely mixing the starting organo-metallic compound or hydrides and the titanium halide, as for example in the amounts indicated.

The mixing may, for example, be effected in a solvent, such as, for instance, hexane.

The catalyst in accordance with the invention is useful for the polymerization of ethylene and/or its higher homologs as, for example, propylene to solid polymers.

The polymerization is effected by merely contacting the gaseous ethylene and/or its homologs with the catalyst. While it is preferable to effect the contacting at a comparatively low pressure of about 10 to 100 atmospheres, the contacting pressure is not critical and a smooth polymerization may be effected at atmospheric or sub-atmospheric pressure. On the other hand, the action of the catalyst on, for example, ethylene remains fundamentally unchanged even if the pressure is increased to any desired, obtainable value.

The temperature of the contacting is not critical and the same may be effected at room temperature or below. It is advantageous to operate at somewhat elevated temperatures, particularly above 50°C. Working at temperatures substantially above 250°C, however, is generally not advisable as the same may detrimentally affect the catalyst.

The minimum quantities of the catalyst in relation to the ethylene or other olefin employed may vary within wide limits and are, for example, dependent on the purity of the monomer. When using a pure monomer, such as pure ethylene, 0.1 parts of catalyst to 1,000 parts of ethylene will be sufficient. Larger quantities of catalyst may, of course, be used. In general, a few percent of catalyst will suffice for most purposes, even with impure monomer, and the use of larger quantities of catalyst may be undesirable in connection with the removal thereof in the purification of the polymer.

The polymerization may be effected in the presence of solvents, such as aliphatic hydrocarbons, such as pentanes, hexanes, cyclohexane, or the like.

The polymers obtained in accordance with the invention are, in general, high molecular, high melting point solids which may be molded or extruded into objects pressed or rolled into plates, sheets, or foils, spun from the melt into threads, ribbons, filaments, or the like.

The polyethylenes obtained with the catalyst in accordance with the invention are generally almost completely linear in molecular structure and have a high tear and tensile strength.

The following examples are given by way of illustration and not limitation;

EXAMPLE 1

20 cc of aluminum tripropyl are carefully mixed with 0.2 grams titanium tetrachloride, which results in a very vigorous generation of heat. The solution becomes an opaque black, and is black, and is introduced under nitrogen into an autoclave of a volume of 500 cc. 60–70 grams of ethylene are forced into the autoclave which is then heated while shaking to 100°C. Within the course of 15 hours, the pressure drops to about 20 atm. The reaction mixture is allowed to cool and the excess ethylene is blown off. The content of the autoclave is in the form of a paste-like mass which consists of a mixture of high-molecular ethylene and low-molecular liquid and solid, soluble products. It is stirred with methyl alcohol, extracted with methylalcoholic hydrochloric acid and thereupon with acetone. There remains 30 grams of an insoluble residue of high melting point which consists of a snow-white, finely granular, powdered mass of polyethylene. The powdery mass is pressed between metal plates heated to 150°C. and thereafter rapidly cooled, thus, forming a film which is extremely elastic and can be torn only with the application of a very great force.

EXAMPLE 2

2 grams of titanium tetrachloride were added, drop by drop, with the exclusion of air, into 40 cc of aluminum triethyl. A black precipitate formed with a vigorous production of heat. 200 cc of hexane were added to the mixture, and a part of the dark substance which had formed precipitated and another portion remained in solution with a dark color in the hexane, presumably in colloidal solution. The hexane fraction was transferred into a 500 cc autoclave which was filled with nitrogen and ethylene was introduced up to a pressure of 60 atmospheres. Upon shaking, the temperature increased spontaneously to 60°C. and the pressure dropped 25 atmospheres. The introduction of ethylene under pressure was repeated but another strong rise in temperature was not noted. Nevertheless, the ethylene pressure receded again though more slowly. Ethylene was introduced under pressure a total of five times, a total of 88 grams of ethylene being introduced in this manner into the autoclave. After a total of 65 hours, it was possible to blow only 4 grams of ethylene out of the autoclave. The content of the autoclave consisted of a solid mass which could be crushed only with a difficulty and which had completely absorbed the solvent used. This mass was broken out of the autoclave in a suitable manner, introduced into methyl alcohol and thereupon heated with methyl-alcoholic hydrochloric acid. After filtration, washing with methyl alcohol and drying, 80 grams of a white difficultly soluble powder were obtained which was pressed between heated metal plates at 160°–170°C. to form clear transparent sheets having extremely good mechanical properties. A narrow strip cut out of such a sheet was stretched in the cold to about 3–4 times its length, in which connection the characteristic phenomena known from the stretching of polyamide tapes was observed. The tear strength of the stretched tapes was as high as 30 kg/mm².

EXAMPLE 3

Example 2 is repeated using as the polymerization excitor the black precipitate which settled upon dilution with hexane which was completely freed from dissolved portions of aluminum triethyl by repeated formation of a suspension with hexane, settling and pouring off of the solvent all with the exclusion of air. In all other respects the procedure and results are substantially the same as in Example 2.

EXAMPLE 4

500 cc of liquid paraffin are deaerated by the introduction of nitrogen and heating to 100°C. After cooling there are added 58 grams of an aluminum trialkyl of the average composition of aluminum tridodecyl, whereupon 2.6 grams titanium tetrachloride are admixed while stirring under nitrogen. The mixture becomes an opaque black. However, no solid precipitate settles out. Thereupon ethylene is introduced while stirring at room temperature. The temperature rises during the course of one-half hour by itself from 23° to 43°C. and the ethylene is vigorously absorbed at a rate of about 10 grams per hour. Soon after the beginning of the experiment it can be noted that a difficultly soluble substance separates out of the mixture. After about 3–4 hours, the absorption of ethylene decreases. There is then added, while stirring, 200 cc hexane in order to dilute the reaction mixture and make it more easily stirrable, whereupon methyl alcohol is added. The reaction mixture at first still remains dark. Only upon suction filtering in contact with air does it change into a light olive green. This color is furthermore at first characteristic of the filtered precipitate. If the precipitate, after washing with methyl alcohol, is heated very slightly with about 5% nitric acid, it becomes pure white. It is then again filtered, washed with methyl alcohol and dried. There are obtained 40 grams of a pure white very loose powder which after pressing into sheets shows all the properties described for the product obtained in accordance with FIG. 2. The activity of the catalyst can be improved and more polyethylene obtained per gram of catalyst if the entire quantity of catalyst is not introduced at the beginning but the catalyst is rather added gradually drop by drop over a lengthy period of time. The same test can also be carried out with cooling of the reaction mixture to 20°C., particularly if a more readily mobile solvent such as hexane is used instead of liquid paraffin. The reaction time is then of course increased.

EXAMPLE 5

Example 4 is repeated but the solution of the catalyst in the liquid paraffin is warmed to about 40°–50°C. and then the gas mixture is passed through it. The said gas mixture contains about 10–20% ethylene as obtained by the thermal cracking of ethene. The course of the reaction is substantially the same as Example 4 but it takes about 10–12 hours before the same quantity of polymer is formed.

EXAMPLE 6

6 Liters of hexane, 82 grams aluminum triethyl and 24 grams titanium tetrachloride are stirred with ethylene of a maximum pressure of 5 atm. in the apparatus described in the preceding example. The initial temperature is 25°C. The temperature rises by itself to 35°C. After a total of 12 hours, the reaction is interrupted. There is then present in the autoclave a thick paste which is worked up in the manner described in detail in Example 5. There is obtained about 1 kg of a colorless, high-grade polyethylene which can be used directly as molding powder.

EXAMPLE 7

50 cc of a 0.5 molecular solution of aluminum triisobutyl in Diesel oil are dissolved in 100 cc Diesel oil and 50 cc of a 0.5 molecular solution of titanium tetrachloride in Diesel oil added drop by drop. The mixture is then stirred for 10 minutes at room temperature, diluted with 2.3 liters of Diesel oil and ethylene introduced at 60°C. After 1 hour polymerization at 60° to 70°C., 230 grams of polyethylene are obtained.

EXAMPLE 8

2.1 grams of titanium tetrachloride (1.2 cc) = 11.4 millimols were added to a suspension of 11.7 gm of aluminum triphenyl = 45.6 millimols in 500 cc of Aliphatin. The white aluminum triphenyl suspension turned brown immediately on the addition of titanium tetrachloride. After shaking overnight in an oscillating ball mill only approximately 15% of the chlorine bound to titanium was still to be found in the centrifuged solution.

The whole suspension was boiled with 500 cc of Aliphatin and introduced into a 5-liter stirring autoclave. Ethylene was pumped into a pressure of 20 atmospheres and the autoclave was slowly heated. During heating up the pressure rose slowly and thereafter fell between 30° and 40°C. to 16 atmospheres. The pressure was again restored to 20 atmospheres by once more pumping in ethylene and then fell only slowly in the course of a day to 13 atmospheres. After blowing off unreacted ethylene, the autoclave was opened. The reaction mixture was black and pasty. After separating the Aliphatin by sectional filtration, boiling with methanolic hydrochloric acid and filtering with suction drying, 85 mg of a gray polyethylene were obtained. A total of approximately 150 gm of ethylene had been introduced.

EXAMPLE 9

About 4.75 gms. of titanium tetrachloride are introduced into a solution of 5.7 gms. triethyl aluminum in 250 cc. of a Fischer-Tropsch Diesel oil (suitably freed, by hydrogenation, of unsaturated constituents and successively distilled over sodium) with stirring and under a nitrogen atmosphere. Agitation is continued for one hour at room temperature. A suspension of a brown-black substance in the Diesel oil is formed. The suspension of the catalyst thus obtained is introduced, with stirring into a 5 liter autoclave filled with nitrogen and containing 1.0 liter of the Diesel oil, and 600 gms. of dried, air-free propylene are pumped in. The temperature is raised to 70°C., stirring being continued, whereupon the pressure increases to a maximum of 21 atm. Within 72 hours, the pressure decreases to 11.0 atm. The unreacted propylene is then released from the warm autoclave and 225 gms. propylene are recovered. The solid polypropylene occurs in a paste-like suspension in the Diesel oil. The suspension is somewhat dark in color due to the presence of portions of the catalyst therein. The solvent is removed from the polypropylene by suction, and the polymer is then freed of Diesel oil by washing with acetone. The polymer is then discolored by heating it under stirring, with methanolic hydrochloric acid. The colorless polypropylene is washed under suction with water to remove the hydrochloric acid, then with acetone to remove the bulk of the moisture, and finally dried.

An additional quantity of the polypropylene is recovered from the Diesel oil mother liquor by precipitation with acetone, and may be processed as described. A total yield of 338 gms. of granular polypropylene is obtained.

The solid, granular polypropylene may be pressed at 140°C. to obtain flexible sheets or films which appear transparent in thin films and opaque in thick layers.

EXAMPLE 10

Example 9 is repeated, except that the propylene is replaced by an equivalent amount of alpha-butylene or of a $C_4$-hydrocarbon rich in alpha-butylene. The poly-n-butylene obtained resembles the polypropylene of Example 9 in appearance but is somewhat softer.

EXAMPLE 11

Example 9 is repeated, except that in addition to propylene an ethylene partial pressure of 1–3 atm. is maintained in the autoclave by connecting the latter with an ethylene cylinder and by carefully adjusting the valve. Because ethylene polymerizes more rapidly than propylene, the composition of the liquid phase is appropriately controlled by taking small samples and by gas analysis; to maintain an amount of ethylene in the liquid which is only a few percent (up to 10%) of the propylene. A solid copolymer is obtained. It may be formed into foils having properties between those of film-forming polyethylene and polypropylene.

EXAMPLE 12

The catalyst is prepared from 17.1 g. triethyl aluminum and 4.75 g. titanium tetrachloride in 250 cc. Diesel oil, and introduced, together with 1390 g. isobutylene, into a 5-liter autoclave filled with nitrogen and provided with a stirrer. The autoclave is then heated to 40°C. and the pressure, initially 5 atm., is raised an additional 4 atm. by pumping in ethylene. The absorption of ethylene commences at once with spontaneous increase of the temperature to 55°C. An ethylene partial pressure of 4 atm. is maintained. After a total of 6 hours, 143 g. ethylene are absorbed. The valve of the ethylene cylinder is then closed, and stirring is continued until the pressure drops to only 5 atms. After cooling, the excess isobutylene is released. The mass remaining in the autoclave is a black slurry. It is diluted with acetone, filtered under suction, thoroughly washed, and further worked up. 216 g of the copolymer of isobutylene and ethylene are obtained, about 60 g of the isobutylene being copolymerized as evidenced by the infra-red spectrum of the copolymer, which is very different from the spectrum of ethylene homopolymers.

EXAMPLE 13

20 g diethylaluminum chloride are mixed carefully with 1 g titanium tetrachloride, in which connection this solution assumes a brown color and a precipitate deposits. 200 cc airdry hexane is added (all such operations being carried out under nitrogen); this, including the precipitate, is then transferred into a 500 cc autoclave and ethylene is forced in under a pressure of 100 atm. Upon shaking, the contents of the autoclave spontaneously become heated to 60°–70°C., and at the same time the ethylene pressure slowly drops. The addition of ethylene is repeated together with shaking three or more times. After shaking for a total of 10 hours, the ethylene has disappeared practically completely and the autoclave is filled with a paste consisting of the solvent used and a white ethylene polymer. The entire reaction mixture is stirred with methyl alcohol in order to decompose the aluminum compound, followed by suction filtering, washing with methyl alcohol and treatment finally at about 100°C. with dilute nitric acid. The polyethylene obtained is again washed thoroughly, filtered and dried. In this way, there is directly obtained a snow-white polyethylene suitable for use as molding powder, the softening point of which is about 150°C. This material can be excellently molded into transparent foils which can also be stretched.

The example is repeated using in place of the diethylaluminum monochloride the same quantity of so-called sesquichloride. The yield of polyethylene corresponds precisely to the total quantity of monomeric ethylene which has disappeared.

EXAMPLE 14

Example 13 is repeated but after the addition of the hexane, ethylene is introduced under a pressure of 1 atm. with stirring. The solution spontaneously becomes heated to about 40°C. Even during the stirring, the difficultly soluble polyethylene precipitates. The introduction of the ethylene is continued until the mass has become a paste which can scarcely be stirred any longer and it is thereupon worked up in the manner described in Example 13. The conversion into polyethylene of the ethylene consumed is quantitative. The ethylene consumption can be easily determined by a simultaneous measurement of the ethylene flowing into the apparatus and the ethylene leaving the apparatus. The experiment can be carried out on as large a scale as desired. Furthermore it can without difficulty be carried on with recycled ethylene.

EXAMPLE 15

To 4.8 g (26.8 mols) diethylaluminumphenolate in 100 cc hydrogenated Fischer-Tropsch Diesel oil which had been distilled over sodium, 0.3 cc (2.7 mols) titanium tetrachloride is added while stirring. The catalyst mixture is diluted to 750 cc and ethylene under a pressure of 5 atm. is introduced with intensive stirring into the orange-colored solution. Starting at about 40°C. polymerization of the ethylene can be noted with a brown discoloration of the solution (precipitate). Within 5 to 6 hours, there are obtained about 40 g polyethylene.

EXAMPLE 16

To a solution of 4.06 g (24 mols) piperidyldiethylaluminum in 40 cc hydrogenated Fischer-Tropsch Diesel oil which has been distilled over sodium there are added 0.46 g (2.4 mols) titanium tetrachloride while stirring. The solution in this connection assumes a reddish color and a brown precipitate deposits. By heating to 80°C. the depositing of the precipitate is completed, the precipitate having a blackish brown color while the superjacent solution is a yellowish brown. The catalyst mixture obtained in this manner (solution and precipitate) is introduced into a 200 cc autoclave and 20 g of ethylene is forced in at pressure of 30 atm. Upon heating to 60°–70°C. and shaking for a total of 24 hours, the ethylene pressure decreases. Thereupon there can be obtained from the autoclave, after the excess ethylene (5 g) has been let off, a brown paste from which the ethylene polymer (about 15 g) can be obtained in the form of a snow-white powder by decomposing the catalyst compound with methyl alcoholic hydrochloric acid followed by washing with acetone. The piperidyldiethylaluminum is prepared in the following manner:

To one mol aluminum triethyl there is slowly added, drop by drop, at room temperature while stirring and with the exclusion of air and moisture 1 mol of completely dry piperidine. In this connection, the temperature rises to about 50°C., and an addition compound is first formed. By thereupon carefully heating to 120°–140°C., this addition compound of aluminum triethyl on piperidine is decomposed with the splitting off of ethane. The piperidyldiethylaluminum is thus obtained as colorless viscous liquid which can be distilled in a high vacuum (95°–100°C., $10^{-3}$ mm Hg) which liquid becomes completely and thoroughly crystalline upon cooling with ice water. It has a melting point of 44°–45°C.

EXAMPLE 17

Eleven and four-tenths g (78 mols) ethylmercaptyldiethylaluminum in 50 cc hexane are carefully mixed with 1.48 g (7.8 mols) titanium tetrachloride. The brownish-black catalyst solution is introduced into a 200 cc autoclave and after the addition of ethylene under pressure (about 30 atm.) heated while shaking to 50°–60°C. The ethylene pressure drops completely within 5–6 hours. The ethylene polymer (15 g) removed from the autoclave is further worked in the same manner as indicated in Example 16.

The ethylmercaptyldiethylaluminum is prepared as follows:

1 mol ethylmercaptan is slowly introduced at room temperature into a mol of aluminum triethyl while stirring, with the exclusion of air and moisture. in this connection, the corresponding quantity of ethane is immediately developed by the spontaneous heating of the mixture. After a short subsequent heating the ethylmercaptyldiethylaluminum can be obtained by distillation in a water-jet vacuum (160/2°C., 12 mm Hg) in the form of a colorless, readily movable liquid.

EXAMPLE 18

Two grams titanium tetrachloride are dissolved in 50 cc hexane and 3.5 grams solid magnesium dimethyl are added in a nitrogen atmosphere. The mixture is introduced, under nitrogen into a small ball mill and vigorously ground for one hour. The ball mill is then emptied into a 200°cc autoclave and the ball mill itself washed out with an additional 25 cc of hexane. Ethylene is thereupon added under a pressure of 70 atmospheres and the autoclave is shaken. The autoclave spontaneously heats itself to about 50°C. and the ethylene pressure drops. Ethylene is again added three times under pressure until a total of 30 grams of ethylene have been introduced into the autoclave. Finally, the autoclave is shaken for a few hours until the pressure in it has dropped to a low residual amount. The contents of the autoclave then consists of a solid cake of baked-together polyethylene particles permeated by the solvent. The cake can be very easily removed from the autoclave. It is kneaded with methyl alcohol and thereupon washed with methyl-alcoholic hydrochloric acid and then again with methyl alcohol, and then dried. There is obtained a white polymer which is insoluble, or at most swells in the customary solvents, and which becomes soft at between 150° and 200°C. It can be readily molded at 170°C. into a clear foil.

In the experiment described here, it is immaterial whether ethylene is used under the indicated pressure or at low pressures, or even with the passage of ethylene through the catalyst mixture.

EXAMPLE 19

10 grams of zinc diphenyl (produced by the process described in Berichte der deutschen Chemischen Gesellschaft 46, 1675 (1913) were ground in an atmosphere of nitrogen with 4.5 grams of titanium tetrachloride and 50 cc of hexane for three hours in an oscillating ball mill. The black suspension formed was introduced into a 200 cc autoclave and 42 grams of ethylene were pumped in. The autoclave was then shaken vigorously for 35 hours at a temperature of 100°C. During this time the pressure fell to 27 atmospheres gauge. 12 grams of ethylene were blown off after cooling. The autoclave containing 25 grams of polyethylene suspended in hexane.

EXAMPLE 20

In a manner analogous to that described in Example 19, 8 grams of magnesium diphenyl (produced by the process described in Berichte der deutschen Chemischen Gesellschaft 46, 1675 (1913) were ground in an atmosphere of nitrogen with 4.5 grams of titanium tetrachloride and 50 cc of hexane for three hours in an oscillating ball mill. The further procedure was as described in Example 19 and 28 grams of polyethylene were obtained after shaking for 30 hours at 100°C.

EXAMPLE 21

To 67.5 grams of water-free zinc chloride (0.5 mol) were added under nitrogen 282 grams (1 mol) of a hydride-free aluminum tri-n-hexyl. Within 1 hour the zinc chloride dissolved with slight heating of the mixture. There was then added to the reaction mixture 65 grams (1.1 mol) of potassium fluoride, whereupon the mixture was stirred for two hours at 120°C. The resulting zinc dihexyl was then freed by distillation ($10^{-4}$Torr) from the potassium fluoride aluminum alkyl complex.

23.5 grams (0.1 mol) of the thusly produced and purified zinc dihexyl were admixed under nitrogen with 50 cc of hexane and 4.5 grams of titanium tetrachloride. After stirring the mixture for one hour at 70°C. the same was transferred into a 200 cc autoclave. 54 grams of ethylene were pressed into the autoclave and the same was vigorously shaken for 30 hours at 100°C.

Upon cooling 15 grams of ethylene were vented. There remained in the autoclave 34 grams of polyethylene suspended in hexane.

EXAMPLE 22

35.2 grams of dihexyl-zinc were dropped into a solution of 9.5 grams of titanium tetrachloride into 250 cc isooctane, the mixture being stirred for half an hour at 70°C. The same was then transferred into a 5 l stirrer-autoclave together with 750 cc isooctane. 635 grams propylene were then pressed into the autoclave and the reaction mixture was stirred for 56 hours at 70°–80°C. After working up the reaction products as set forth in Example 9, 56 grams of a substantially colorless polypropylene were obtained.

Example 23

75 cc of a suspension of propyl-magnesium chloride were prepared as set forth in application Ser. No. 745,999. This suspension was ground together with 18.4 grams of titanium tetrabromide for 2 hours in a fast ball mill. The resulting now dark colored, suspension was transferred into a 5 l stirrer autoclave together with 925 cc toluol. 610 grams propylene were pressed into the autoclave and the reaction mixture was stirred for 51 hours at 70°–80°C. After working up the resulting products as set forth in Example 22, 295 grams of polypropylene were obtained.

In each of the examples the titanium tetrahalide specified, as for example the titanium tetrachloride and titanium tetrabromide, as the case may be, is initially reduced to the corresponding titanium trihalide. The catalyst composition used for the polymerization in these examples thus consists essentially of the reaction product obtained on admixing the corresponding titanium trihalide with the particular organo-metallic compound or hydride in question.

As the titanium trihalide is, so to speak, formed in situ from the titanium tetrahalide, the two are complete equivalents and each of the examples may be repeated initially using the corresponding trihalide in place of the tetrahalide, and in each case the catalyst composition used for the polymerization is formed.

In the majority of the examples, the titanium trihalide is not only formed in situ but its valent state is further reduced, in part, below 3. The quantity of the organo-metallic compound or hydride is sufficient for this purpose.

In place of the particular organo-metallic compounds or hydrides mentioned, in the examples, any of the organo-metallic compounds or hydrides previously mentioned herein or mentioned in our applications listed above or in the oath may be used.

The molar ratio of the organo-metallic compound to the titanium halide may be varied within wide limits from a few tenths to 14 and more including a ratio from 0.3–10. In the examples, the ratios fall within the range.

What is claimed is:

1. A catalyst composition for polymerizing olefins consisting essentially of the reaction product obtained on admixing a titanium trihalide with an organoaluminum compound containing at least one alkyl radical bonded to aluminum, the quantity of the organoaluminum compound being at least 0.3 of the molar amount of the titanium.

2. The catalyst composition as set forth in claim 1 wherein the titanium trihalide is titanium trichloride.

3. The catalyst composition as set forth in claim 1 wherein the titanium trihalide is titanium tribromide.

4. The catalyst composition as set forth in claim 1 wherein the organoaluminum compound is an alkyl aluminum halide.

5. The catalyst composition as set forth in claim 1 wherein the organoaluminum compound is an alkyl aluminum hydride.

6. The catalyst composition as set forth in claim 1 wherein the molar ratio of the organoaluminum compound to the titanium trihalide varies from 0.3 to 10.

7. The catalyst composition as set forth in claim 1 wherein the organoaluminum compound is aluminum trialkyl.

8. A catalyst composition consisting essentially of the reaction product obtained on admixing a titanium trihalide with an aluminum hydride, the quantity of said aluminum hydride being at least 0.3 of the molar amount of the titanium.

9. A catalyst for polymerizing olefins consisting essentially of the reaction product obtained on admixing a titanium trihalide with an aryl aluminum halide, the quantity of the aryl aluminum halide being at least 0.3 of the molar amount of the titanium.

10. A catalyst for polymerizing olefins consisting essentially of the reaction product obtained on admixing a titanium trihalide with an aluminum triaryl, the quantity of the aluminum triaryl being at least 0.3 of the molar amount of the titanium.

* * * * *

UNITED STATES PATENT OFFICE
CERTIFICATE OF CORRECTION

PATENT NO. : 3,903,017
DATED : September 2, 1975
INVENTOR(S) : Karl Ziegler, Heinz Breil, Erhard Holzkamp and Heinz Martin It is certified that error appears in the above-identified patent and that said Letters Patent are hereby corrected as shown below:

Page 1, Item [73] Assignee: between "m.b.H." and "Max-Planck-Institut" insert

-- a trustee of --.

Signed and Sealed this twentieth Day of April 1976

[SEAL]

Attest:

RUTH C. MASON
*Attesting Officer*

C. MARSHALL DANN
*Commissioner of Patents and Trademarks*

UNITED STATES PATENT AND TRADEMARK OFFICE
CERTIFICATE OF CORRECTION

PATENT NO. : 3,903,017
DATED : September 2, 1975
INVENTOR(S) : Karl Ziegler et al It is certified that error appears in the above-identified patent and that said Letters Patent are hereby corrected as shown below:

Insert in the first column on the face of the patent

-- [*] Notice: The portion of the term of this patent subsequent to December 3, 1980, has been disclaimed. --

Signed and Sealed this

Eleventh Day of September 1979

[SEAL]

Attest:

Attesting Officer

LUTRELLE F. PARKER
*Acting Commissioner of Patents and Trademarks*